US008996882B2

(12) United States Patent
Lu et al.

(10) Patent No.: US 8,996,882 B2
(45) Date of Patent: Mar. 31, 2015

(54) EXECUTION METHOD OF .NET PROGRAM AFTER ENCRYPTION

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 95 days.

(21) Appl. No.: 13/824,418

(22) PCT Filed: Oct. 25, 2011

(86) PCT No.: PCT/CN2011/081217
§ 371 (c)(1),
(2), (4) Date: Mar. 18, 2013

(87) PCT Pub. No.: WO2012/055343
PCT Pub. Date: May 3, 2012

(65) Prior Publication Data
US 2013/0198527 A1 Aug. 1, 2013

(30) Foreign Application Priority Data
Oct. 28, 2010 (CN) .......................... 2010 1 0523253

(51) Int. Cl.
*G06F 21/00* (2013.01)
*G06F 21/12* (2013.01)
*G06F 9/445* (2006.01)
*G06F 21/52* (2013.01)
*G06F 9/455* (2006.01)

(52) U.S. Cl.
CPC .............. *G06F 21/12* (2013.01); *G06F 9/445* (2013.01); *G06F 21/00* (2013.01); *G06F 21/52* (2013.01); *G06F 9/45504* (2013.01)
USPC ......................................... 713/189

(58) Field of Classification Search
CPC ....................................................... G06F 21/12
USPC .......................................................... 713/187
See application file for complete search history.

(56) References Cited

U.S. PATENT DOCUMENTS

| 6,795,921 | B2* | 9/2004 | Hayashi et al. | ................ | 726/33 |
| 2002/0116623 | A1* | 8/2002 | Bussert | ........................ | 713/191 |
| 2004/0098613 | A1* | 5/2004 | Schiavoni et al. | ........... | 713/200 |
| 2005/0171910 | A1* | 8/2005 | Wu et al. | ........................ | 705/50 |
| 2009/0138863 | A1* | 5/2009 | Lu et al. | ....................... | 717/159 |

(Continued)

OTHER PUBLICATIONS

Hansche et al., WO85/02310, Published May 23, 1985.*

(Continued)

*Primary Examiner* — Mohammad L Rahman
(74) *Attorney, Agent, or Firm* — Hammer & Associates, P.C.

(57) ABSTRACT

The present invention provides an execution method of a .NET program after encryption. An operating system allocates a process address space to a .NET program process and maps PE files into the process address space respectively. After the .NET program process runs, it is judged whether a currently running program module is encrypted. The .NET program process continues to run after the encrypted program module is decrypted. If the current program module calls a subroutine module, it is judged whether the subroutine module is encrypted. If the subroutine module is encrypted, a decryption operation is performed, and the .NET program process continues to run. With the method, encryption management can be performed on the .NET program based on modules, thereby providing diversified functions for protecting .NET software.

11 Claims, 3 Drawing Sheets

(56) References Cited

U.S. PATENT DOCUMENTS

2010/0058047 A1   3/2010  Medvinsky
2010/0146589 A1*  6/2010  Safa .................................. 726/3

OTHER PUBLICATIONS

Pietrek, Matt, "An In-Depth Look into the Win32 Portable Executable File Format", Feb. 2002.*

* cited by examiner

EXECUTION METHOD OF .NET PROGRAM AFTER ENCRYPTION

FIELD OF THE INVENTION

The invention relates to information security field and in particular to, an execution method of .NET program after encryption, or a method for executing an encrypted .NET program.

PRIOR ART

A .NET platform is a new generation of technical platform with Microsoft, also a brand-new cross-language software development platform based on internet, which follows the trend of distributed computing, component-oriented, enterprise-level application, software-as-a-service and Web-centered in the current software section. The .NET is not a development language, but more development languages, such as C#, C++, Visual Basic, Jscript, are supported on the .NET development platform.

Development of .NET technology encourages more applications of .NET software, and more authorized .NET software is cracked due to interest driven, therefore, it is difficult to protect the .NET software, and protection on .NET software in prior art focuses more on a compiled .NET program, which can be cracked easily.

Moreover, the all-around protection on a .NET program in the prior art incurs inconvenience to a software development company, for example, when a software company sells software to a customer, it quotes for the software based on functions, and therefore if the customer only selects some of the functions, the software company should modify the software and delete the not-customized functions when selling the software, so if more customers come, the company should repeat modifying the software, which makes trouble for management of the selling.

As stated above, the shortcoming in the prior art is that the protection on the compiled .NET program makes the program easy to be cracked and the complete encryption of the program incurs inconvenience to management on the software.

SUMMARY OF THE INVENTION

An execution method of .NET program after encryption includes loading a HOOK engine and a .NET kernel, starting a .NET process, and running a .NET program module by an operating system;

determining whether a current program module is encrypted by the HOOK engine;

if the current program module is encrypted, invoking a decryption module to decrypt the current program module, compiling and executing the current program module in real time, and determining whether the current program module invokes a sub-program module by the HOOK engine;

if the current program module invokes a sub-program module, obtaining the sub-program module and determining whether the sub-program module is encrypted by the HOOK engine;

if the sub-program module is encrypted, invoking a decryption module to decrypt the sub-program module, compiling and executing the current sub-program module in real time by the HOOK engine, and going on running, invoking other program modules, returning and executing the HOOK engine to determine whether the current program module is encrypted by the .NET process;

if the sub-program module is not encrypted, compiling and executing the sub-program module in real time by the HOOK engine, and going on running, invoking other program modules, returning and executing the HOOK engine to determine whether the current program module is encrypted by the .NET process;

if the sub-program module is not invoked, going on running, invoking other program modules, returning and executing the HOOK engine to determine whether the current program module is encrypted by the .NET program; and if the current program module is not encrypted, compiling and executing the current program module by the HOOK engine, going on running, invoking other program modules, returning and executing the HOOK engine to determine whether the current program module is encrypted by the .NET program.

Preferably, after determining whether the current program module is encrypted by the HOOK engine, if the current program module is not encrypted, the method further comprises compiling and executing the current program module in real time by the HOOK engine, going on running, invoking other program modules, returning and executing the HOOK engine to determine whether the current program module is encrypted by the .NET program.

Preferably, before the starting the .NET process, the method comprises creating a process address space for the .NET process and mapping the PE file referenced by the .NET process to the process address space by the operating system.

Preferably, before determining whether the current program module is encrypted by the HOOK engine, the method further comprises, before the .NET program starts, invoking API of the operating system to traverse all program modules in the process space of the .NET program, determining whether the program module is encrypted and obtaining a beginning address of PE file of the encrypted program module in the process space by the HOOK engine.

Correspondingly, the determining whether the program module is encrypted comprises determining whether data relating to the ninth byte of the PE file subject to the current program module is 0x00, if yes, the current program module is not encrypted, if not, the current program module is encrypted.

Preferably, the invoking a decryption module to decrypt the current program module comprises monitoring, by the HOOK engine, the .NET process, in case of determining that the current program module is encrypted, inserting, by the HOOK engine, a jump instruction so as to jump the .NET program to the decryption module specified by the HOOK engine and executing the decryption program.

Preferably, before running the .NET program modules, the method further comprises encrypting the .NET program modules which specifically is encrypting Metadata in the PE file, including confusing the Metadata according to a predetermined rule, adding garbage data, and encrypting IL codes of specific function with predetermined key and algorithm.

Correspondingly, the executing the decryption program comprises recovering Metadata according to a predetermined rule, discarding garbage data and decrypting IL codes with predetermined key and algorithm.

Preferably, the obtaining the sub-program module comprises locating a beginning address of the PE file of the sub-program module in the process space; invoking API of the operating system to traverse all modules of a current process and retrieving the sub-program module to obtain information of the sub-program module.

Correspondingly, the locating a beginning address of PE file of the sub-program module in the process space specifically comprises moving forward from the beginning address of the sub-program module to an address of integer times of 0x1000, decreasing 0x1000 from the moved address for traversing by the HOOK engine; determining whether the current traversed address is the beginning address of the PE file, if yes, obtaining the address, or if not, going on decreasing 0x1000 forward for traversing.

Correspondingly, the determining whether the current traversed address is a beginning address of the PE file specifically comprises reading two bytes of data from the current traversed address, if the data being read is 0x5a4d, skipping 0x003a bytes backward from 0x5a4d, reading 4-byte data, converting the 4-byte data into a small-end storage format, taking the converted data as an offset, offsetting backward (offsetting toward a high address side) from the current traversed address, if data 0x5045 is obtained, the current traversed address is the beginning address of the PE file, if not, the current traversed address is not the beginning address of the PE file.

Preferably, the retrieving the sub-program module comprises locating a beginning address mapping the PE file of the sub-program module to the process space, the Hook engine invoking API of the operating system to traverse all program modules in the process space, retrieving the program module corresponding to the beginning address mapping the PE file to the process space.

Advantages of the invention are that the method provided by the invention solves the problem that the compiled program is easy to be cracked and brings convenience and speed on software protection by protecting a .NET program in one module and another in case of protecting a .NET program.

BRIEF DESCRIPTION OF THE DRAWINGS OF THE INVENTION

EMBODIMENT FOR CARRYING OUT THE INVENTION

Figure 1:
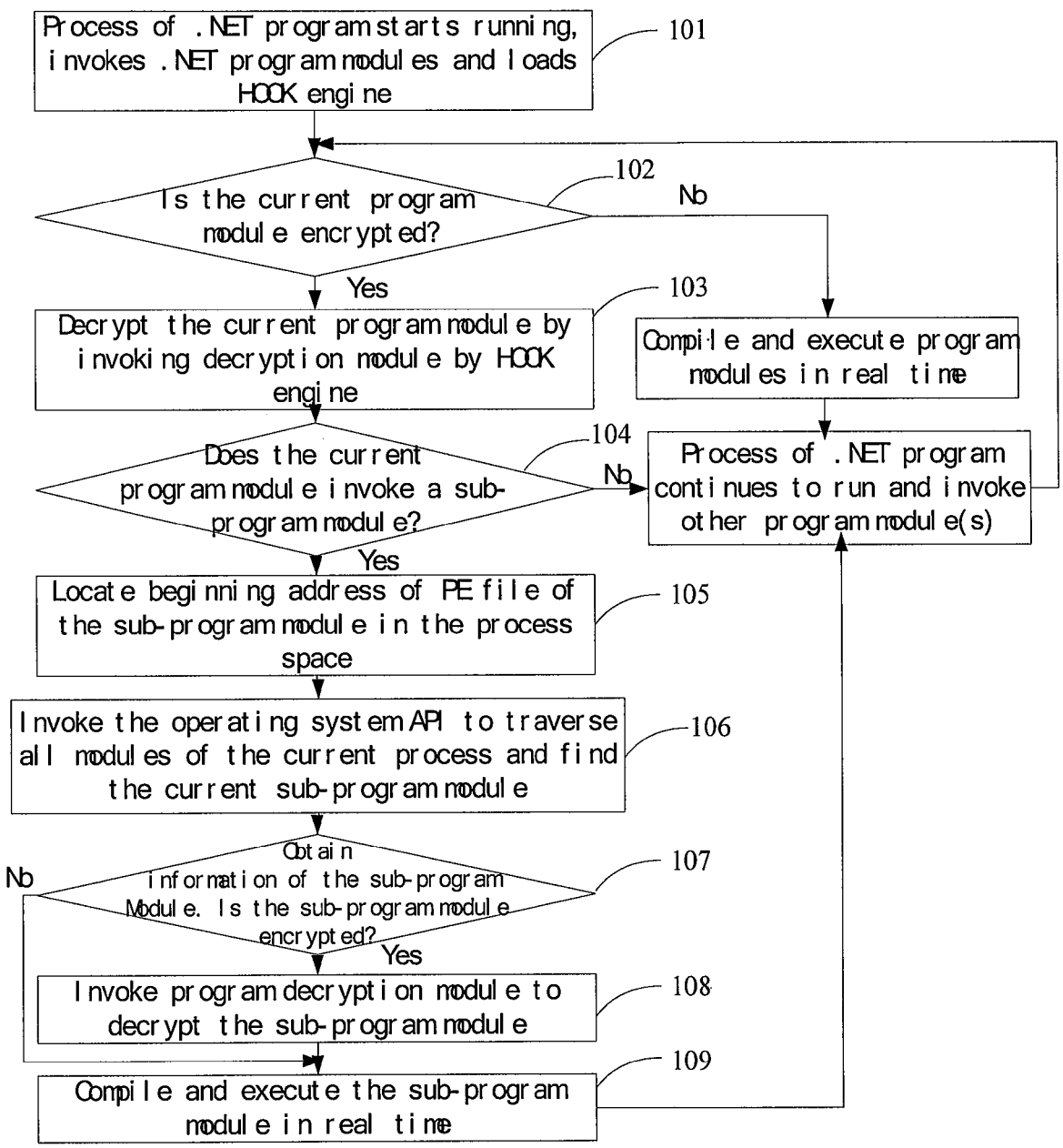
FIG. 1 illustrates a flow chart of an execution method of .NET program after encryption provided by an embodiment of the invention.

For making purpose, solutions and advantages clearer, embodiments of the invention will be detailed in accompanying with the drawings as below.
Embodiment As illustrated in FIG. 1, the embodiment of the invention provides an execution method of .NET program after encryption, including steps as follows.

Step 101, an operating system loads a .NET kernel, starts .NET process, runs .NET program modules, and loads a HOOK engine.

Figure 2:
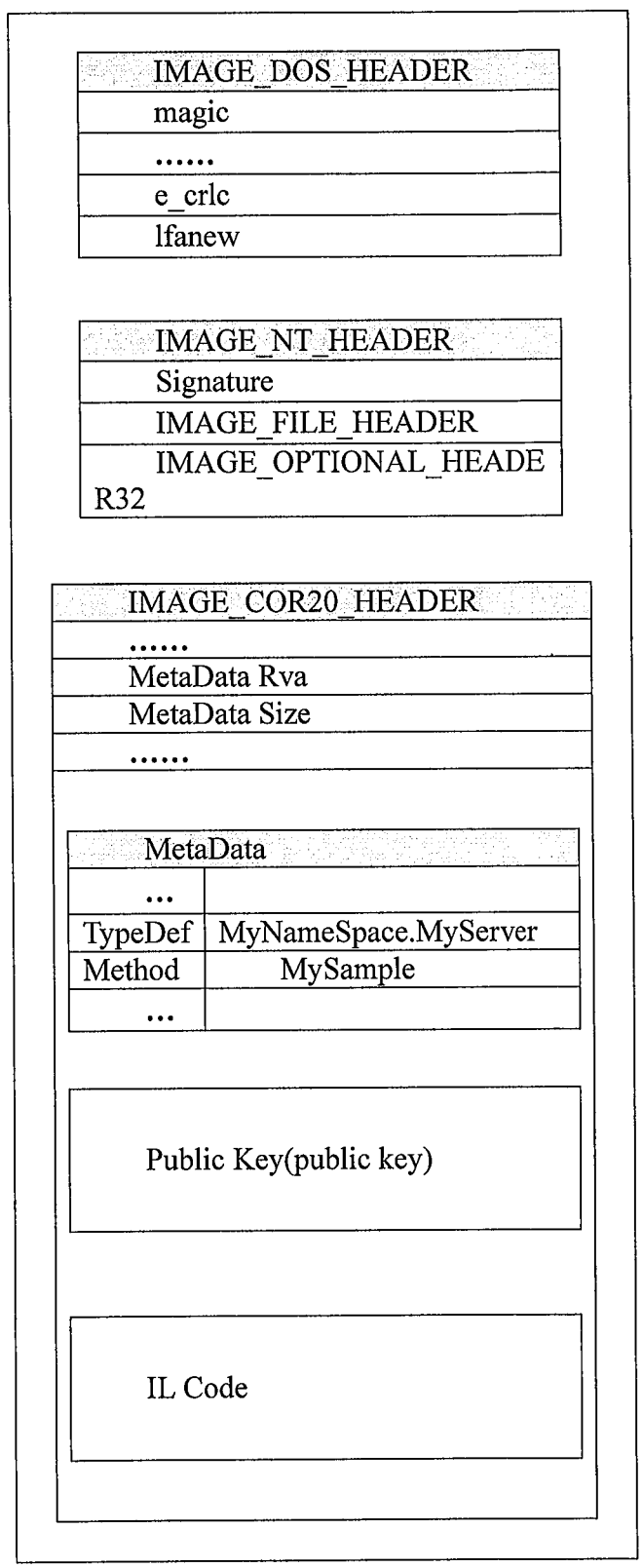
FIG. 2 illustrates a structural diagram of PE file in the embodiment of the invention.

A .NET compiler compiles a .NET program programmed with high-level language into IL (intermediate language) codes and packages the IL codes in a PE (Portable Executable) file. The PE file is an executable file format in Windows operating system with suffix of .exe and .dll, including a DOS header, a NT header, Metadata, a Public Key, and IL codes, etc. The IL codes are located in Metadata. Structure of the PE file is shown in FIG. 2.

IL codes cannot be directly executed but is complied to be a computer executable machine language by a just-in-time (JIT) compiler in Common Language Runtime (CLR) on .NET platform. CLR is a running environment of .Net program, which is multi-language executable environment and supports a quantity of data types and language characteristics.

In the embodiment of the invention, a .NET process includes many program modules, this means that more PE files are referenced, and program modules can be invoked with each other. A program module invoked by another program module is called sub program module. The program module includes .exe file and .dll file. The .NET compiler compiles each program module into IL codes and packaged the IL codes and Metadata subject to each program module as a PE file.

The operating system creates a process address space for a .NET process and maps the PE file referenced by the .NET process to the process address space, in which each PE file occupies an address space of integer times of 0x1000 (4K), for example, all 32-bit applications occupy a process address space of 4 GB (a 32-bit address can map a maximum memory of 4 GB). For a Microsoft Windows operating system, application can access to a process address space of 2 GB which is called a virtual address space in user mode. All modules owned by an application share a single virtual address space in user mode.

HOOK engine, if other specific operation needs to be executed before executing a specified program module in the .NET program, the HOOK engine inserts a jump instruction in front of the program module, for example, modifies a special segment of instructions in virtual address space of some module in JMPxxxxxxxx format for inserting a callback function so as to add additional functions.

In case of executing the specific program module, the .NET program jumps, while intercepting execution of the specific program module, to a HOOK Sub program (Callback function) pointed by a jump instruction inserted by the HOOK engine, executes the Callback function and then the rest program modules following the interrupted program module one by one.

Step 102, Hook engine determines whether the current program module is encrypted, if yes, Step 103 is executed, while if not, HOOK engine compiles and executes the program module in real time and then the .NET program goes on running and executes other program modules in turn.

In the embodiment of the invention, before the .NET process is started, the HOOK engine invokes API (Application Programming Interface) of the operating system to traverse all program modules in process space of the .NET program so as to obtain all encrypted program modules and a beginning address of PE file of the encrypted program modules in the process space.

In the embodiment, the method for determining whether the program modules in the process space of the .NET program are encrypted is determining whether the ninth byte of the PE file corresponding to the current program module which is data in offset 0x00000008h of the PE file, is 0x00 or not, if yes, the PE file in the current program module is not encrypted, while if not the PE file in the current program module is encrypted.

In the PE file, a field IMAGE_DOS_HEADER->e_crlc is used for flagging whether the PE file is encrypted, which is the ninth byte of the PE file, and after HOOK engine enumerates all program modules of the .NET program, the determining whether program modules in the .NET program are encrypted is completed by determining the ninth byte of the PE file corresponding to the program modules in the .NET program.

For example, an encrypted PE file is provided as follows.

```
00000000h: 4D 5A 90 00 03 00 01 00 04 00 00 00 FF FF 00 00
00000010h: B8 00 00 00 00 00 00 00 40 00 00 00 00 00 00 00
00000020h: 00 00 00 00 00 00 00 00 00 00 00 00 00 00 00 00
00000030h: 00 00 00 00 00 00 00 00 00 00 00 00 80 00 00 00
...
00000080h: 50 45 00 00 4C 01 03 00 92 38 84 45 00 00 00 00
00000090h: 00 00 00 00 E0 00 0E 01 0B 01 06 00 00 04 00 00
00000098h: 0B 01 06 00 00 04 00 00 00 04 00 00 00 00 00 00
000000a8h: FE 22 00 00 00 20 00 00 40 00 00 00 00 40 00
000000b8h: 00 20 00 00 00 02 00 00 04 00 00 00 00 00 00 00
000000c8h: 04 00 00 00 00 00 00 00 80 00 00 00 02 00 00
...
00003098h: 01 00 00 06 05 00 00 06 08 00 00 06 03 00 00 00
...............
```

In the first line, 00000000h refers to an offset address, 4D 5A 90 00 03 00 01 00 04 00 00 00 FF FF 00 00 refers to specific data in the PE file which is the first 16-byte data of the PE file. The PE file is shown in form of Hexadecimal number, so are the following lines of data. Due to a too long length, only part of data is selected for setting forth the invention.

In the above mentioned PE file, the ninth byte is 0x04, which discloses that the current PE file is an encrypted file and so the current program module is encrypted.

In the embodiment, the encrypting the program module is not encrypting the whole PE file, but processing Metadata in the PE file, including confusing metadata according to a predetermined rule, adding garbage data, and encrypting IL codes of a specific function with predetermined key and algorithm.

After process of the .NET program is started, the HOOK engine monitors the process, and upon monitoring that the .NET program is executed to the encrypted program module, the HOOK engine inserts a jump instruction to skip the .NET program to a decryption program designated by HOOK engine and executes the decryption program.

By invoking the APIN of the operating system, a list of all program modules subject to the current process can be obtained, so be information of the program modules which includes beginning address of the PE file of the program modules in the process address space and information of whether the program modules are encrypted or not, etc.

Step 103, the HOOK engine invokes a decryption module to decrypt the current program module, compiles and executes the program module in real time.

When the process is executed to the encrypted program module, the HOOK engine intercepts the encrypted program module, and according to the jump instruction being inserted by HOOK engine, the process jumps to the decryption program module designated by the HOOK engine, invokes the designated program module to decrypt the encrypted program module and the .NET kernel compiles and executes the encrypted program module in real time.

In opposition to encrypting the program modules at Step 102, the decrypting the program modules includes: recovering the metadata according to a predetermined rule, discarding the garbage data, and decrypting IL codes with predetermined key and algorithm.

Step 104, the .NET kernel determines whether the current program module invokes a sub-program module, if yes, Step 105 is executed, while if not, the .NET program goes on running and invokes other program modules.

When the .NET kernel compiles and executes the above decrypted program module in real time, if it determines that the program module invokes other program modules which are sub-program modules, it obtains a beginning address of the sub-program module in the process space and Step 105 is executed.

Step 105, the .NET kernel locates a beginning address mapping the PE file of the sub-program module into the process space.

The .NET kernel locates a beginning address of the PE file in the process space according to the beginning address of the sub-program module, including the following steps.

1) align to 4K boundary, which is moving forward (move toward the lower address side) from a beginning address of the sub-program module to an address of integer times of 0x1000, wherein the 4 k boundary is an offset of integer times of 0x1000, for example, if beginning address of the current sub-program module is 0x40100E, a current address is 0x401000 after alignment to 4K boundary.

2) Hook engine decreases 0x1000 from the aligned address;

According to the above example, align 4K boundary from a beginning address of the current sub-program module to obtain an address 0x401000, decrease 0x1000 to obtain a new address 0x400000.

3) determine whether the current traversed address is the beginning address of PE file, if yes, obtain the address, or if not, decrease 0x1000 for traversing.

The PE file includes a DOS header, PE feature and MetaData wherein the DOS header id and value of PE feature are constant. Reading Dos header id and PE feature includes steps that first two bytes of PE file are DOS header id, for example 0x5a4d;

the four-byte data obtained by skipping 0x003a bytes backward from the Dos header identifier is a relative offset of the PE feature to the beginning address of PE file; in the PE file, the format of the relative offset of PE feature is a big-end storage format, which is storing low bytes in high address and high bytes in low address, and therefore in case that data is read by skipping 0x003a bytes backward from the Dos header identifier, the real relative offset of the PE feature is 0x00000080;

locate PE feature according to the relative offset 0x00000080 of the PE feature to the beginning address of the PE file and obtain the PE feature 0x5045.

So, whether the file is a PE file can be determined by Dos header identifier and PE feature;

Correspondingly, in the embodiment of the invention, determining whether the current traversed address is the beginning address of PE file includes steps of reading two bytes from the current address, if the read data is 0x5a4d, skipping 0x003a bytes backward from 0x5a4d, reading 4 bytes, converting the 4 bytes into a small-end storage format which means storing low bytes in low address and high bytes in high address, taking the converted data as an offset relative to the current 4 k boundary to locate, if the located data is 0x5045, the current traversed address is the beginning address of PE file.

Go on the above example, determine whether 0x400000 is a beginning address of the PE file, if yes, obtain the address 0x400000 and skip to Step 106, if not, decrease 0x1000 from the current address and keep determining whether the decreased address is the beginning address of PE file till finding the beginning address of PE file.

Step 106, invoke the API of the operating system to traverse all program modules in the current process and retrieve the sub-program module;

The HOOK engine invokes API of the operating system to traverse all program modules in the current process space and retrieves the program module corresponding to the beginning address of PE file obtained at Step 105.

Figure 3:
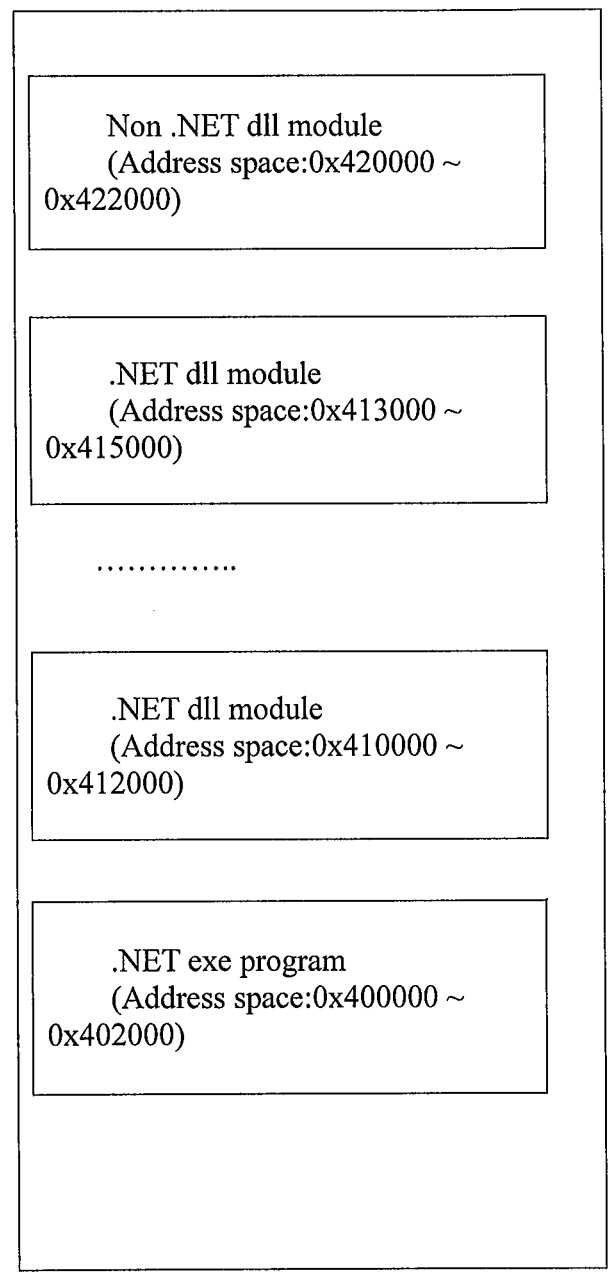
FIG. 3 illustrates a structural diagram of the .NET program modules in the process address space of the embodiment of the invention.

Take FIG. 3 for an example for description, which illustrates a address space of the .NET process in a memory space, and Windows process modules mapping conforms to boundary of 1K alignment, and therefore align 1 k in address space of the process for searching can traverse beginning addresses of all program modules being loaded by the .NET process.

Step 107, obtain detailed information of the sub-program module and know whether the sub-program module is encrypted or not, if the sub-program module is encrypted, go to Step 108, if the sub-program module is not encrypted, go to Step 109.

After the HOOK engine traverses the sub-program module with the operating system API of operating system, it obtains information of whether the sub-program module is encrypted, if yes, Step 108 is executed, while if not, Step 109 is executed.

Specifically, check whether value of the ninth byte of the PE file is 0x00, if yes, a determination is made that the sub program module is encrypted, otherwise, the sub program module is not encrypted.

Step 108, invoke a decryption program module to decrypt the sub-program module;

Step 109, compile and execute the sub-program module in real time.

After the compilation and execution in real time, process of the .NET program goes on running and invokes other program module(s).

The method provided by the embodiment encrypts a .NET program in terms of module, which is convenient for protection.

The above-mentioned are just the preferred embodiments of the invention, not limited to the invention. All modifications, substitutions and improvements, etc, within the spirit and principle of the invention will fall within the scope of protection of the invention.

The invention claimed is:

1. An execution method of .NET program after encryption, characterized in that said method comprises:
    loading an HOOK engine and a .NET kernel, starting a .NET process, and beginning to run a .NET program module by an operating system;
    determining, by the HOOK engine, whether a current program module is encrypted;
    invoking, by the HOOK engine, a decryption module to decrypt the current program module, if the current program module is encrypted;
    compiling the current program module in real time by the HOOK engine;
    executing compiled program module by the HOOK engine; and
    determining whether the current program module invokes a sub-program module by the HOOK engine;
    obtaining the sub-program module, and determining whether the sub-program module is encrypted, if the sub-program module is invoked, wherein obtaining the sub program module includes locating a beginning address of a PE file of the sub program module in the process space, and invoking API of the operating system to traverse all modules in the current process, retrieving the sub program module, and obtaining information of the sub program module, and wherein locating the beginning address of the PE file of the sub program module in the process space includes moving forward from the beginning address of the sub program module to an address of integer times of 0x1000, decreasing 0x1000 from the address moved forward for traversing by the HOOK engine, and determining whether the current traversed address is the beginning address of the PE file, if yes, obtaining the address; if not, going on decreasing 0x1000 for traversing;
    invoking the decryption module to decrypt the sub-program module, if the sub-program module is encrypted;
    compiling the sub-program module in real time;
    executing compiled sub-program module;
    invoking other program modules by the .NET process, returning and executing the HOOK engine to determine whether the current program module is encrypted by the .NET process;
    compiling the sub-program module and executing compiled sub-program module in real time, if the sub-program module is not encrypted;
    going on running and invoking other program modules by the .NET process, returning and executing the HOOK engine to determine whether the current program module is encrypted by the .NET process;
    if the sub-program module is not invoked, going on running and invoking other program modules by the .NET process, returning and executing the HOOK engine to determine whether the current program module is encrypted by the .NET process; and
    compiling the current program module and executing compiled current program module in real time by the HOOK engine, if the current program module is not encrypted;
    going on running and invoking other program modules by the .NET process, returning and executing the HOOK engine to determine whether the current program module is encrypted.

2. The method of claim 1, wherein determining whether the current program module is encrypted by the HOOK engine, if the current program module is not encrypted, the method further comprises:
    compiling and executing the current program module in real time by the HOOK engine, going on running and invoking other program modules by the .NET process, returning and executing the HOOK engine to determine whether the current program modules are encrypted by the .NET process.

3. The method of claim 1, wherein before the step of starting a .NET process, the method further comprises:
    creating a process address space for the .NET process, and mapping the PE file referenced by the .NET process into the process address space by the operating system.

4. The method of claim 1, wherein before the step of determining whether the current program module is encrypted by the HOOK engine, the method further comprises:
    invoking, by the HOOK engine, API of the operating system to traverse all program modules in the process space of the .NET program, and determining whether each of the program modules is encrypted, and obtaining a beginning address of the PE file of the encrypted program module in the process space before the .NET process starts.

5. The method of claim 4, wherein the determining whether the program module is encrypted comprises:
    determining whether data in the ninth byte of the PE file corresponding to the current program module is 0x00, if yes, the current program module is not encrypted; if not, the current program module is encrypted.

6. The method of claim 1, wherein the invoking a decryption module to decrypt the current program module comprises:

monitoring, by the HOOK engine, the .NET process, if a determination is made that the current program module is an encrypted program module, inserting, by the HOOK engine, a jump instruction to skip the .NET program to a decryption module specified by the HOOK engine, and executing the decryption program.

7. The method of claim 1, wherein before running the .NET program module, the method further comprises:

encrypting the .NET program modules, specifically encrypting meta data in the PE file, comprising steps of confusing the meta data according to a predetermined rule, adding garbage data, and encrypting IL codes of a specified function with a predetermined key and algorithm.

8. The method of claim 6, wherein the executing the decrypting program comprises a step of recovering the meta data with a predetermined rule, discarding garbage data, and decrypting the IL codes with the predetermined key and algorithm.

9. The method of claim 7, wherein the executing the decrypting program comprises a step of recovering the meta data with a predetermined rule, discarding garbage data, and decrypting the IL codes with the predetermined key and algorithm.

10. The method of claim 1, the determining whether the current traversed address is the beginning address of the PE file comprises:

reading two bytes of data from the current traversed address, if the data being read is 0x5a4d, skipping 0x003a bytes backward from 0x5a4d and reading four bytes of data, converting the four bytes of data into small-ended storage method, taking the converted data as an offset, offsetting backward from the current traversed address, if the obtained data is 0x5045, the current traversed address is the beginning address of the PE file, if not, the current traversed address is not the beginning address of the PE file.

11. The method of claim 1, wherein the retrieving the sub program module comprises:

locating a beginning address mapping the PE file of the sub program module to the process space, invoking, by the HOOK engine, API of the operating system to traverse all program modules in the process space, and retrieving the program module according to the beginning address mapping the PE file to the process space.

* * * * *